US012802548B2

(12) United States Patent
Ding et al.

(10) Patent No.: US 12,802,548 B2
(45) Date of Patent: Nov. 17, 2026

(54) DATA-DRIVEN STREET FLOOD WARNING SYSTEM

(71) Applicant: NEC Laboratories America, Inc., Princeton, NJ (US)

(72) Inventors: Yangmin Ding, East Brunswick, NJ (US); Sarper Ozharar, Pennington, NJ (US); Yue Tian, Princeton, NJ (US); Ting Wang, West Windsor, NJ (US)

(73) Assignee: NEC Corporation, Tokyo (JP)

( * ) Notice: Subject to any disclaimer, the term of this patent is extended or adjusted under 35 U.S.C. 154(b) by 458 days.

(21) Appl. No.: 18/485,217

(22) Filed: Oct. 11, 2023

(65) Prior Publication Data

US 2024/0135797 A1 Apr. 25, 2024

Related U.S. Application Data

(60) Provisional application No. 63/415,416, filed on Oct. 12, 2022.

(51) Int. Cl.
*G08B 21/10* (2006.01)
*G01W 1/14* (2006.01)

(52) U.S. Cl.
CPC ............... *G08B 21/10* (2013.01); *G01W 1/14* (2013.01)

(58) Field of Classification Search
CPC ................................ G08B 21/10; G01W 1/14
See application file for complete search history.

(56) References Cited

U.S. PATENT DOCUMENTS

2018/0373993 A1* 12/2018 Petty ...................... G06N 5/046
2020/0313763 A1* 10/2020 Wang ............... H04B 10/25753

FOREIGN PATENT DOCUMENTS

| | | | | | |
|---|---|---|---|---|---|
| CN | 109272484 | A | * | 1/2019 | G06F 18/214 |
| JP | 2018146559 | A | * | 9/2018 | |
| KR | 102308526 | B1 | * | 10/2021 | G01W 1/14 |
| KR | 102365591 | B1 | | 2/2022 | |

* cited by examiner

*Primary Examiner* — Andrew Schechter
*Assistant Examiner* — Kaleria Knox
(74) *Attorney, Agent, or Firm* — Vincent Duffy

(57) ABSTRACT

A data-driven street flood warning system that employs distributed fiber optic sensing (DFOS)/distributed acoustic sensing (DAS) and machine learning (ML) technologies and techniques to provide a prediction of street flood status along a telecommunications fiber optic cable route using the DFOS/DAS data and ML models. Operationally, a DFOS/DAS interrogator collects and transmits vibrational data resulting from rain events while an online web server provides a user interface for end-users. Two machine learning models are built respectively for rain intensity prediction and flood level prediction. The machine learning models serve as predictive models for rain intensity and flood levels based on data provided to them, which includes rain intensity, rain duration, and historical data on flood levels.

13 Claims, 8 Drawing Sheets

DATA-DRIVEN STREET FLOOD WARNING SYSTEM

CROSS-REFERENCE TO RELATED APPLICATIONS

This application claims the benefit of United States Provisional Patent Application Ser. No. 63/415,416 filed Oct. 12, 2022, the entire contents of which is incorporated by reference as if set forth at length herein.

FIELD OF THE INVENTION

This application relates to distributed fiber optic sensing (DFOS)/distributed acoustic sensing (DAS) systems, methods, and structures and artificial intelligence, machine learning (ML) technologies. More particularly, it pertains to a data-driven street flood warning system that employs DFOS and ML techniques.

BACKGROUND OF THE INVENTION

In many United States cities, flooding has become increasingly common and destructive to contemporary society, infrastructure and economic damage, social disruption, housing inequity and loss of life. From 1978 to 2015, urban flooding, contributing to overall general flooding damage, killed 3,345 people, and caused about $285 billion in direct damage. Numerous communities across the United States are facing similar challenges and the increasing trend will continue with the growing number of extreme weather events resulting from a changing climate.

As will be readily appreciated, urban flooding is challenging to forecast. A major reason is the scarcity of data and rapidly changing weather events. Urban flooding events, especially less dramatic ones, are poorly documented. This data scarcity is partly due to a high cost of sensing network installation and maintenance for wide urban areas and partly due to technical challenges of remote sensing. For example, satellite imaging is affected by cloud cover and complex street geometry, and its revisit time interval is too long (typically one scanning per 14 days). Consequently, satellite imaging usually cannot capture a weather-induced flooding event due to satellite orbital limitations. These knowledge and data gaps prevent weather researchers from examining events systematically, identifying the driving mechanisms conclusively, and developing numerical models efficiently. Consequently, decision-makers are not informed about flood mitigation measures, flooding risks, and prevention strategies in a timely manner such that proactive, preventative measures may be taken.

SUMMARY OF THE INVENTION

The above problem is solved and an advance in the art is made according to aspects of the present disclosure directed to a data-driven street flood warning system that employs distributed fiber optic sensing (DFOS)/distributed acoustic sensing (DAS) and machine learning (ML) technologies and techniques.

In sharp contrast to the prior art, systems, and methods according to aspects of the present disclosure provide a prediction of street flood status along a telecommunications fiber optic cable route using DFOS/DAS and ML models.

Operationally, a DFOS/DAS interrogator collects and transmits vibrational data resulting from rain events while an online web server provides a user interface for end-users.

According to aspects of the present disclosure, two machine learning models are built respectively for rain intensity prediction and flood level prediction. The machine learning models serve as predictive models for rain intensity and flood levels based on data provided to them, which includes rain intensity, rain duration, and historical data on flood levels.

DETAILED DESCRIPTION OF THE INVENTION

Figure 1A:
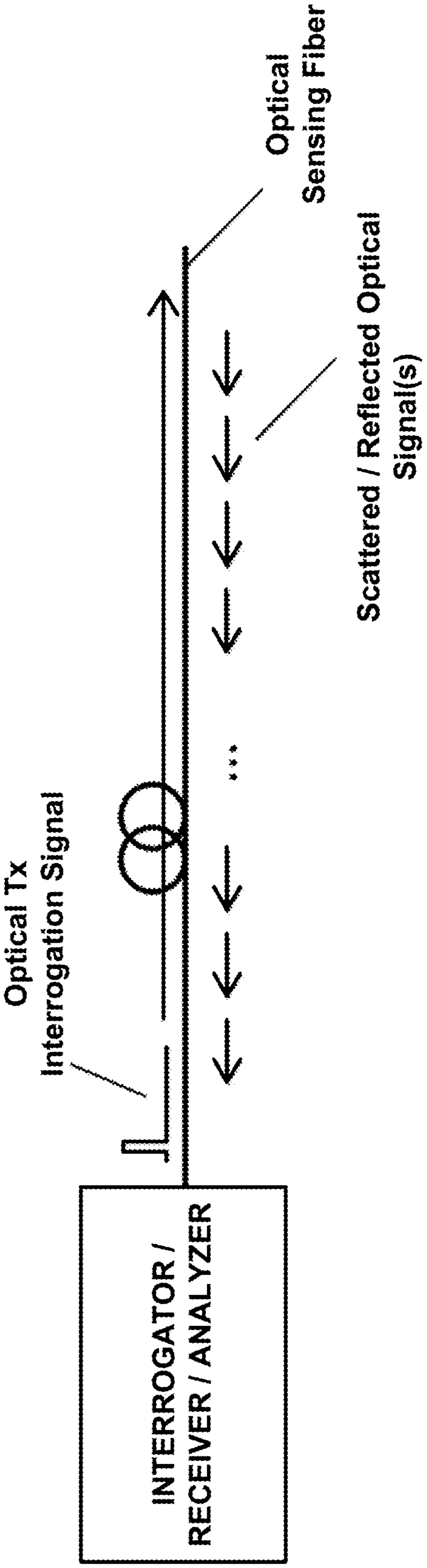
FIG. 1(A) and FIG. 1(B) are schematic diagrams showing an illustrative prior art uncoded and coded DFOS systems.

The following merely illustrates the principles of this disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are intended to be only for pedagogical purposes to aid the reader in understanding the principles of the disclosure and the concepts contributed by the inventor (s) to furthering the art and are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that any block diagrams herein represent conceptual views of illustrative circuitry embodying the principles of the disclosure.

Unless otherwise explicitly specified herein, the FIGs comprising the drawing are not drawn to scale.

By way of some additional background, we note that distributed fiber optic sensing systems interconnect opto-electronic integrators to an optical fiber (or cable), converting the fiber to an array of sensors distributed along the length of the fiber. In effect, the fiber becomes a sensor, while the interrogator generates/injects laser light energy into the fiber and senses/detects events along the fiber length.

As those skilled in the art will understand and appreciate, DFOS technology can be deployed to continuously monitor vehicle movement, human traffic, excavating activity, seismic activity, temperatures, structural integrity, liquid and gas leaks, and many other conditions and activities. It is used around the world to monitor power stations, telecom networks, railways, roads, bridges, international borders, critical infrastructure, terrestrial and subsea power and pipelines, and downhole applications in oil, gas, and enhanced geothermal electricity generation. Advantageously, distributed fiber optic sensing is not constrained by line of sight or remote power access and—depending on system configuration—can be deployed in continuous lengths exceeding 30 miles with sensing/detection at every point along its length. As such, cost per sensing point over great distances typically cannot be matched by competing technologies.

Distributed fiber optic sensing measures changes in "backscattering" of light occurring in an optical sensing fiber when the sensing fiber encounters environmental changes including vibration, strain, or temperature change events. As noted, the sensing fiber serves as sensor over its entire length, delivering real time information on physical/environmental surroundings, and fiber integrity/security. Furthermore, distributed fiber optic sensing data pinpoints a precise location of events and conditions occurring at or near the sensing fiber.

Figure 1B:
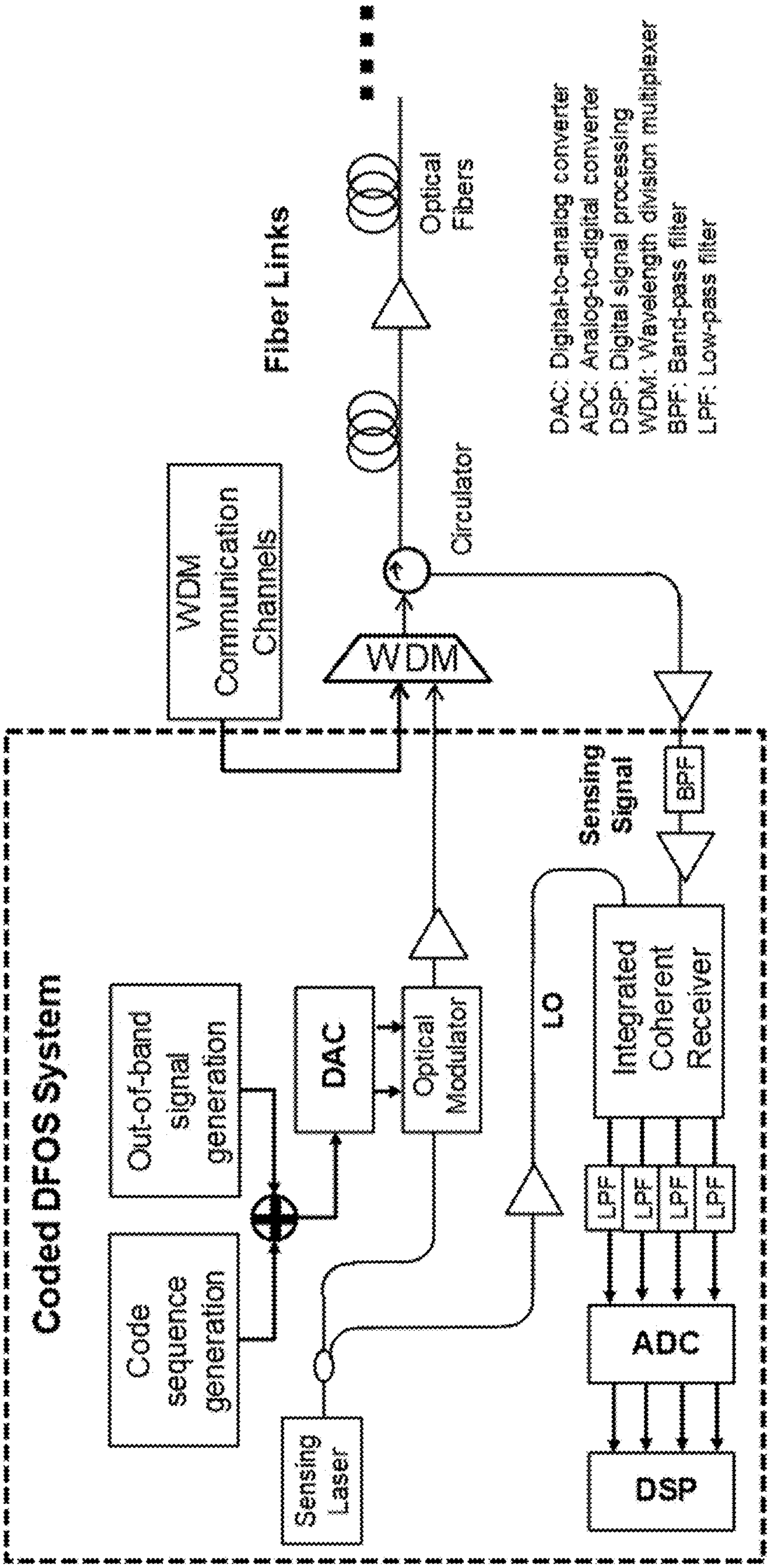

A schematic diagram illustrating the generalized arrangement and operation of a distributed fiber optic sensing system that may advantageously include artificial intelligence/machine learning (AI/ML) analysis is shown illustratively in FIG. 1(A). With reference to FIG. 1(A), one may observe an optical sensing fiber that in turn is connected to an interrogator. While not shown in detail, the interrogator may include a coded DFOS system that may employ a coherent receiver arrangement known in the art such as that illustrated in FIG. 1(B).

As is known, contemporary interrogators are systems that generate an input signal to the optical sensing fiber and detects/analyzes reflected/backscattered and subsequently received signal(s). The received signals are analyzed, and an output is generated which is indicative of the environmental conditions encountered along the length of the fiber. The backscattered signal(s) so received may result from reflections in the fiber, such as Raman backscattering, Rayleigh backscattering, and Brillion backscattering.

As will be appreciated, a contemporary DFOS system includes the interrogator that periodically generates optical pulses (or any coded signal) and injects them into an optical sensing fiber. The injected optical pulse signal is conveyed along the length optical fiber.

At locations along the length of the fiber, a small portion of signal is backscattered/reflected and conveyed back to the interrogator wherein it is received. The backscattered/reflected signal carries information the interrogator uses to detect, such as a power level change that indicates—for example—a mechanical vibration.

The received backscattered signal is converted to electrical domain and processed inside the interrogator. Based on the pulse injection time and the time the received signal is detected, the interrogator determines at which location along the length of the optical sensing fiber the received signal is returning from, thus able to sense the activity of each location along the length of the optical sensing fiber. According to aspects of the present disclosure, classification methods may be further used to detect and locate events or other environmental conditions including acoustic and/or vibrational and/or thermal along the length of the optical sensing fiber.

Figure 2:
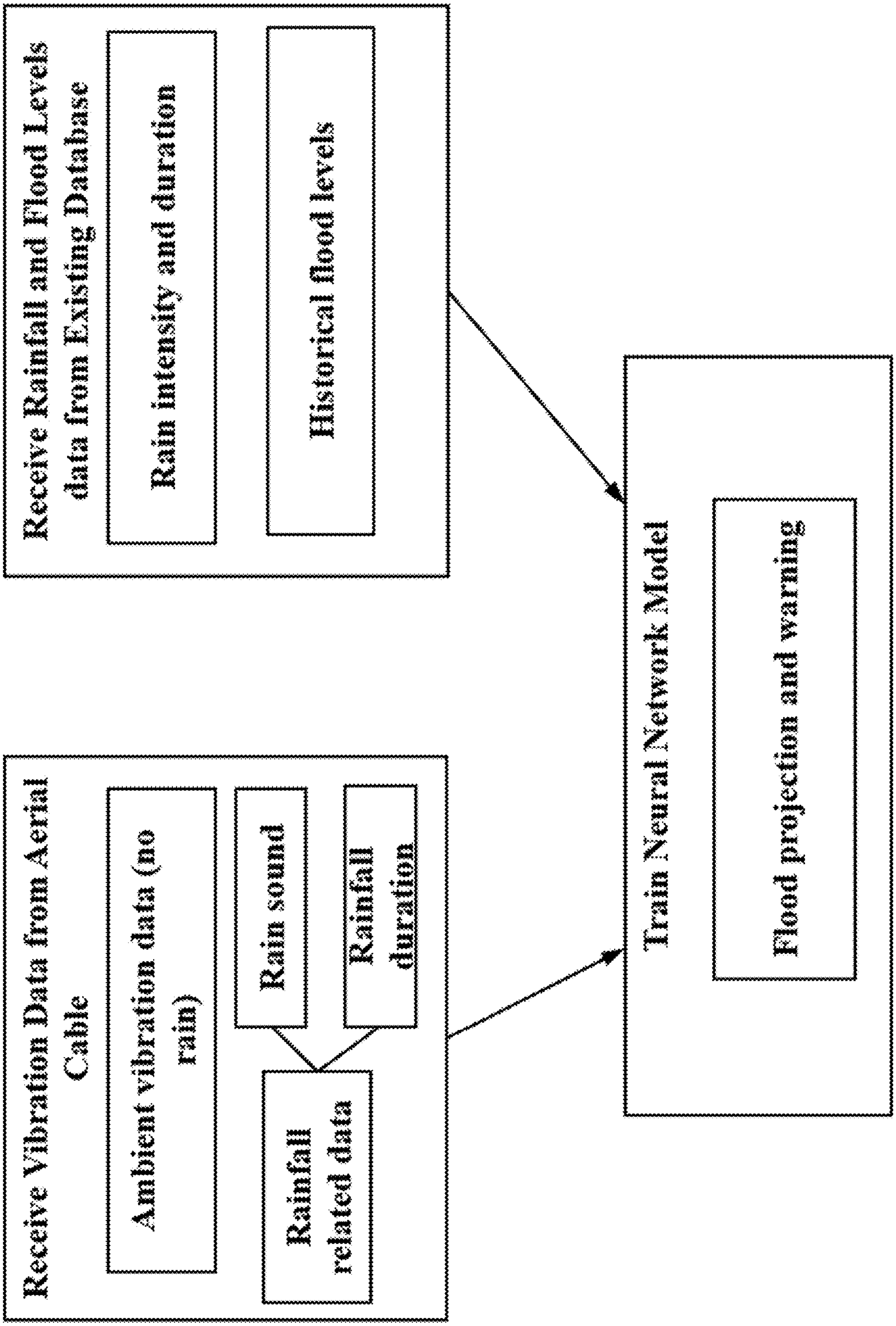
FIG. 2. Is a schematic flow diagram showing an overall set of key operational features of systems and methods according to aspects of the present disclosure.

FIG. 2. It is a schematic flow diagram showing an overall set of key operational features of systems and methods according to aspects of the present disclosure. As illustrated, our inventive systems and methods include structures and circuitry configured to receive vibration data from aerial telecommunications fiber optic cable using the DFOS/DAS system and structures such as those illustratively shown previously. As will be understood and appreciated, such DFOS/DAS data may include ambient vibration data (no rain), and rainfall related vibrational data that may result from falling rain as well as the duration of the falling rain and, intensity of the rainfall.

Existing database(s) of rainfall data provide rainfall and flood level data including rain intensity and duration data as well as historical flood level data.

Finally, using the above data, machine learning (ML) models are trained that provide flood projection and warning data/notifications.

While not specifically shown in this figure, there are at least three circuit elements employed in our inventive systems and methods that provide much of its functionality. Data collection circuitry is designed/used for collecting rain data and historical flood level data. Data processing circuitry provides hosting operations and resources for machine learning models which project flood levels. Finally, online web server circuitry provides a data visualization and user interfaces for end-users and other systems and methods as necessary.

Data Collection Operation

The distributed fiber optic sensing/distributed acoustic sensing (DFOS/DAS) interrogator is optically connected to a fiber optic cable thereby providing an optical sensor fiber along a target route. As is known, the DFOS/DAS system can detect and measure dynamic strain changes that occur along the length of the optical sensor fiber by detecting optical phase shifts of backscattered light relative to a local optical oscillator. When rain drops strike the optical sensor fiber of the fiber optic cable, vibrations caused by the rain drop strikes produce a time-varying phase shift in the backscattered light, and therefore can be directly detected and localized by the DFOS/DAS system. As will be further appreciated by those skilled in the art, the fiber optic cable employed and any individual optical sensor fiber(s) may, in addition to carrying the DFOS/DAS interrogation signals and backscattered light, may also simultaneously carry live telecommunications traffic.

Cable section identification: The fiber optic cable section location is determined by the location of a utility pole that suspends at least a portion of the optical cable and optical sensor fiber. The GPS locations of the utility pole can be obtained from an owner of the pole—if such data/information is available—such as a utility company. Advantageously, GPS locations of the utility pole(s) may be determined at the time the poles were installed. The GPS information thus can be preloaded to a graphical user interface (GUI), a part of the DFOS/DAS system. Or, if GPS location(s) are not used, the distance(s) in terms of the sensor fiber length from the interrogator can be employed by performing a hammer test on the pole and mapping the length location along the sensor fiber.

For example, when a utility pole is impacted by a hammer or other striking instrument, the resulting vibration propagates from the pole to the optical sensing fiber (in two directions) which makes a "V" shape. In a waterfall image as received/produced by the DFOS/DAS system, the location corresponding to the tip of the "V" is the location of that pole so impacted in terms of optical sensor fiber length from the interrogator. Of course, such distance measurement or location is different from a GPS coordinate location which is not dependent on the fiber length.

Historical flood level data collection: Historical flood level data with corresponding rainfall intensity and duration, may be obtained from the National Weather Service. Those data serve as labels for machine learning development.

Data Processing Operation

Rain Intensity Prediction Based on Linear Regression

Figure 3:
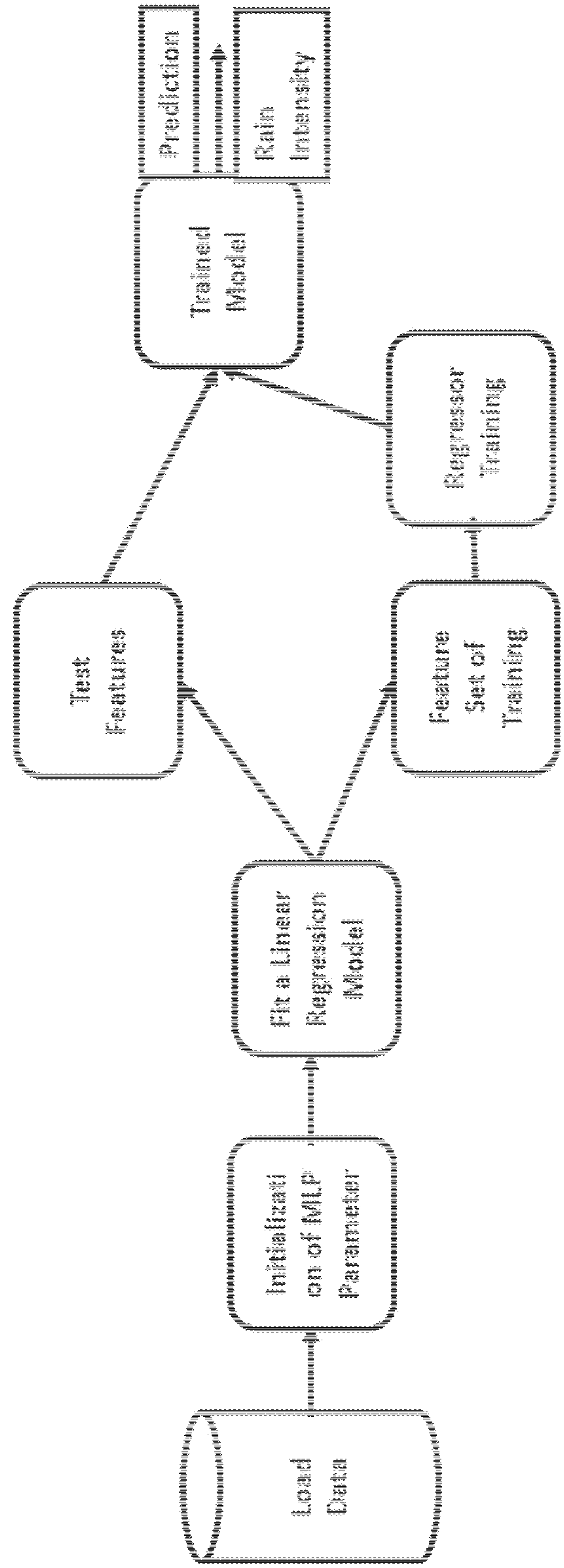
FIG. 3 is a schematic flow diagram showing an illustrative method for prediction rain intensity according to aspects of the present disclosure.

FIG. 3 is a schematic flow diagram showing an illustrative method for prediction of rain intensity according to aspects of the present disclosure. Our prediction is based on a linear regression model. According to our inventive prediction, we employ both training data and held-out test data. We extract features for our training data and fit a regression model. During testing, we extract the features for test audio waves as one of four classes, including no rain, light rain, moderate rain, and heavy rain, and expect the trained regression model to predict the corresponding rain intensity.

Flood Level Monitoring Based on Random Forest

A supervised learning technique (a random forest model) is implemented according to aspects of the present disclosure. The random forest uses data in a tabular (table) format, which is an ensemble of decision trees. Each decision tree, in the ensemble, processes sampling data and predicts an output label, in our case the "flood levels". Decision trees in the ensemble are independent and can predict the final response.

The random forest model used in this disclosure is implemented in Scikit-learn. Mathematical details of the random forest model are as follows and for each decision tree, Scikit-learn calculates the importance of a node based on Gini importance:

$$ni_j = w_j C_j - w_{left(j)} C_{left(j)} - w_{right(j)} C_{right(j)}$$

where:

$ni_j$: the importance of node j;

$w_j$: weighted number of samples reaching node j;

$C_j$: the impurity value of node j;

left(j): child node from left split on node j; and right(j): child node from right split on node j;

The sum of the feature's importance value on each tree can be calculated and divided by the total number of trees:

$$RFf_{i_i} = \frac{\sum_{j \in all\ trees} normfi_{jj}}{T}$$

where:

$RFf_{i_i}$ is the importance of feature i calculated from all trees in the model;

$normfi_{jj}$ is the normalized feature importance for i in tree j; and

T is the total number of trees.

When identifying a flood level, we want to know what flood level (group) an observation belongs to. It is a classic case of multi-class classification problem, as the level of flooding to be predicted is more than two. The inbuilt Random Forest Classifier function in the Scikit-learn library can be used to predict the flood levels.

Figure 4:
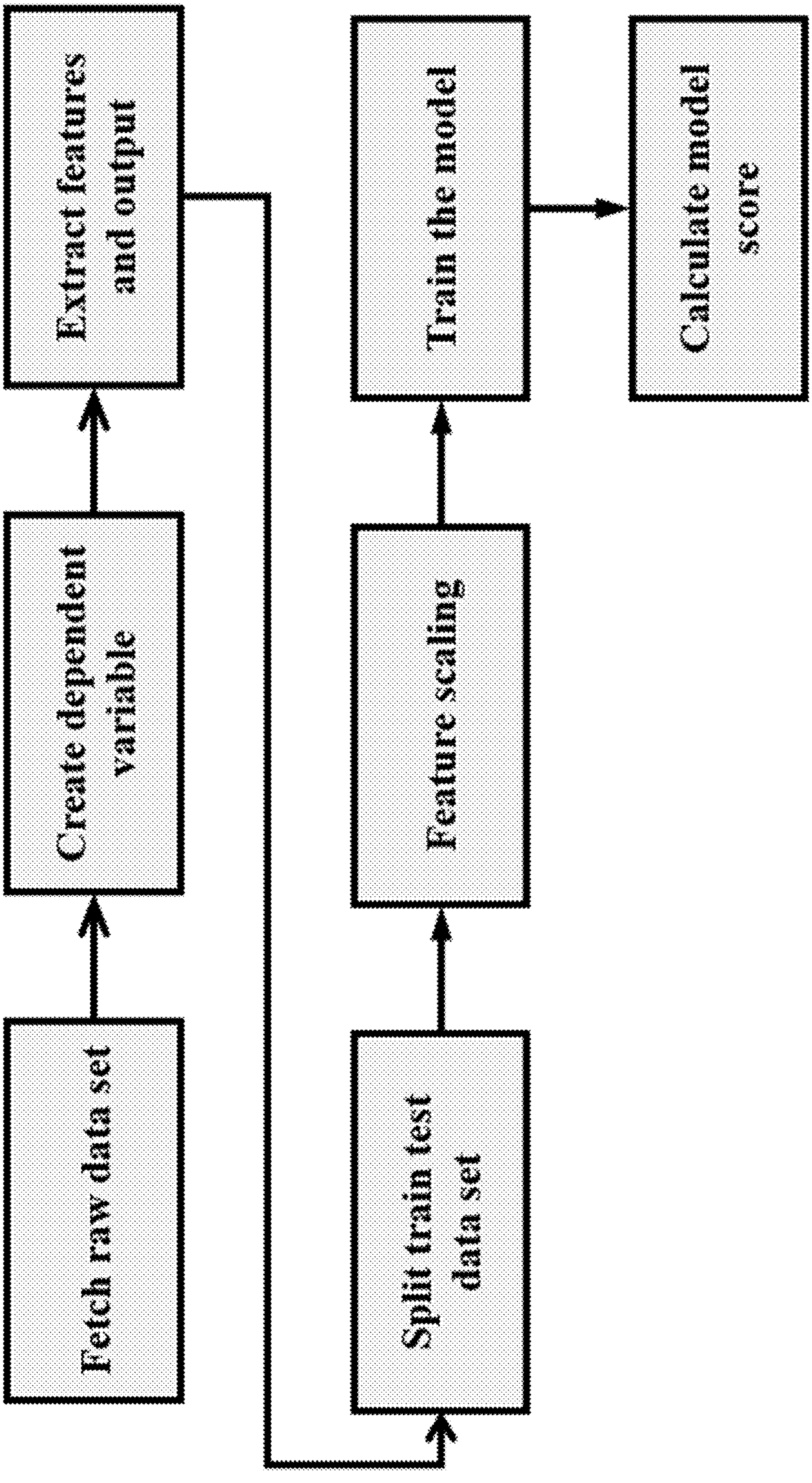
FIG. 4 is a schematic flow diagram showing an illustrative random forest model for flood level prediction according to aspects of the present disclosure.

FIG. 4 is a schematic flow diagram showing an illustrative random forest model for flood level prediction according to aspects of the present disclosure. From this figure, we can understand the following operations.

Fetch the raw dataset: Raw DFOS/DAS vibration signals resulting from detected vibration events occurring along the optical sensor fiber (no rain, light rain, moderate rain, and heavy rain) can be stored in a cloud, networked, or a local storage system. The raw signals.

Create the dependent variable class: Since our Random Forest can only predict numbers, we convert flood levels from "level 1 (Alert, stand by)", "level 2 (Preparation)", "Level 3 (Evacuation) . . . " to numerical levels, i.e., [0, 1, 2, . . . ].

Extract features and output: We split the dataset into independent and dependent variables. In our tabularly organized dataset, the first three columns are independent variables (rain intensity, rain duration, historical flood level), whereas the last column, "flood level", is the dependent variable, and these values were converted from a data frame to an array for future use.

Split train-test data: Since our data volume is sufficiently large, we use 80% of the data for training and the remaining 20% as test data.

Feature scaling: A standard scale operation that subtracts the mean value of the observation and then divides it by the unit variance of the observation is used.

Train the model: We define parameters for the random forest training. For example, we define 5 trees in our random forest; define a loss function to measure the quality of a split and define a seed to randomize the dataset. Finally, we use both the dependent and independent datasets to train the random forest.

Calculate the model score: Firstly, we predict the "flood level" class of the test data using the test feature set. We use the prediction function of the random forest classifier to predict classes. Then, we convert the numeric classes of the predicted values and test actual values into textual equivalents. The performance of the classifier was evaluated using Confusion Matrix.

Online Web Server

The online web server provides a user interface for end-users. As noted, our inventive system and method can send 3 different flood level alerts. These alerts may advantageously be sent from a cloud service that is in communication with the system.

The first such flood level alert is for a flood level 1—a condition indicative of a water level increasing at more than the normal rate. The second flood level alert is for a flood level 2—a notification for governmental agencies and the public to prepare to evacuate. Finally, the third flood level alert is for a flood level 3—a notification for the public and others instructing them to immediately evacuate.

Figure 5:
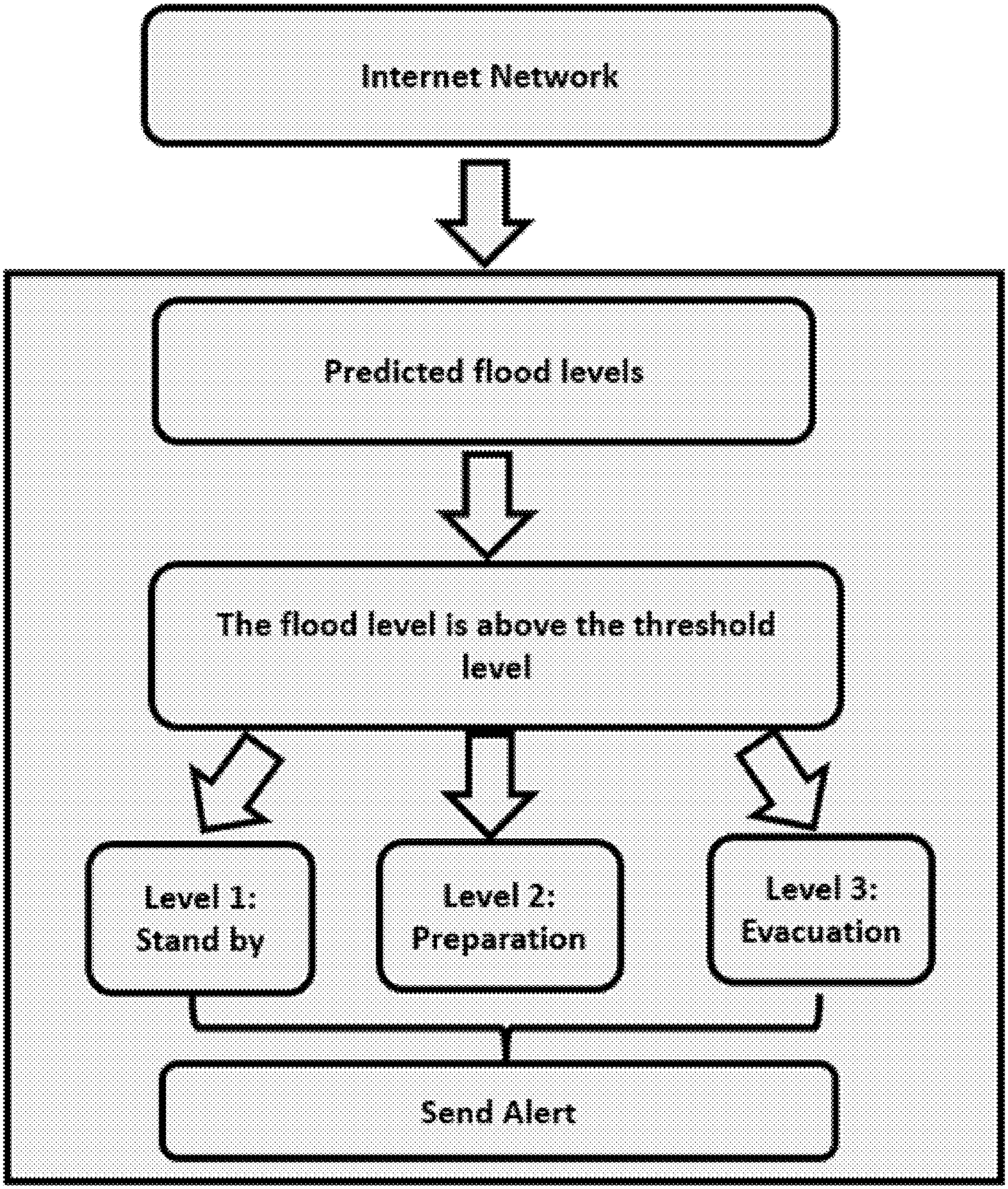
FIG. 5 is a schematic diagram showing illustrative online web server for flood level monitoring according to aspects of the present disclosure.

FIG. 5 is a schematic diagram showing an illustrative online web server for flood level monitoring according to aspects of the present disclosure. As illustratively shown in that figure, our web server is shown connected to the Internet from where it obtains data both historical and may also acquire data in real time from DFOS/DAS operation in real time. As noted previously noted, predicted flood levels are determined from weather conditions and historical data as evaluated by our operational model. When a predicted flood level is determined to be above a threshold level, an appropriate flood level alert is generated, and alert notifications sent to appropriate persons.

Figure 6:
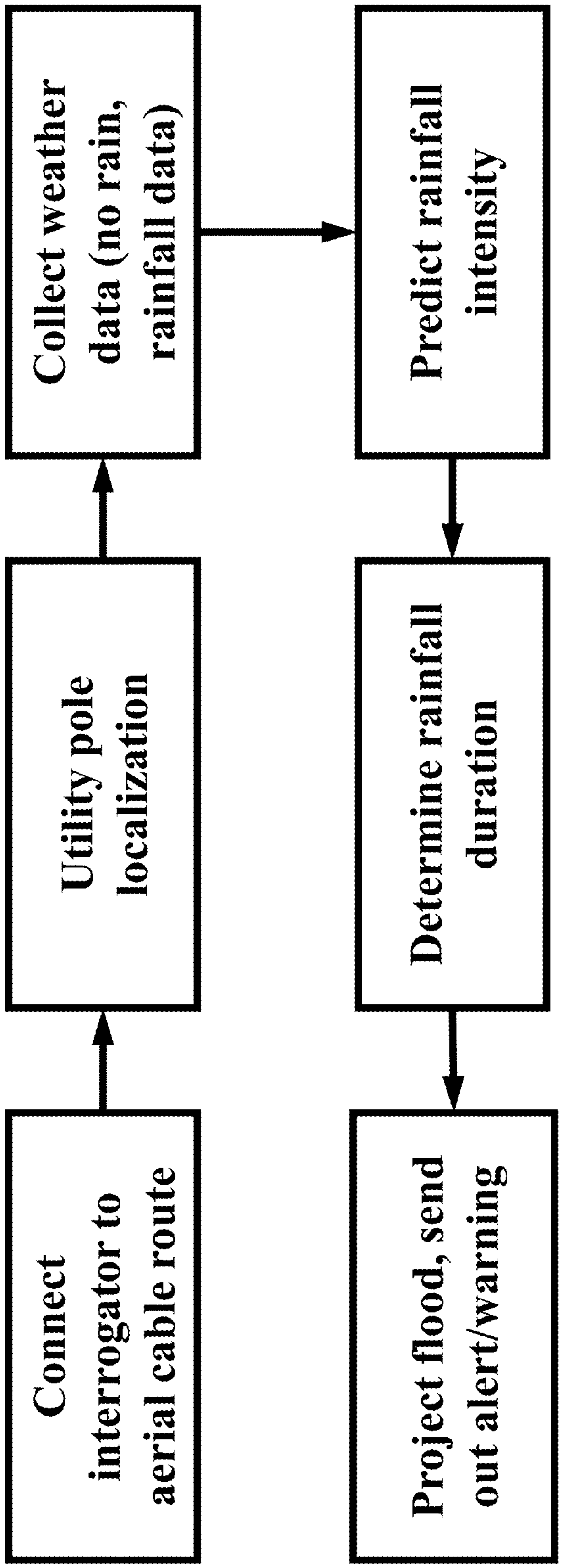
FIG. 6 is a schematic flow diagram showing illustrative operation of rain intensity and flood monitoring using DFOS/DAS and ML according to aspects of the present disclosure.

FIG. 6 is a schematic flow diagram showing illustrative operation of rain intensity and flood monitoring using DFOS/DAS and ML according to aspects of the present disclosure. With reference to that figure, an overall operation of our inventive systems and method may be understood. At a first step, a DFOS/DAS interrogator is connected to an optical sensor fiber that is at least partially an aerial cable route. At a next step, utility pole localization is performed in conjunction with DFOS/DAS operation and either employing GPS or DFOS/DAS locating by mechanical impacts on the utility poles. As a next step, weather data is collected such as rain, no rain, and rainfall data about amounts. At the next step, rainfall intensity is predicted. Then, at a next step rain fall duration is determined. Finally, flood predictions are projected, and any alerts/warnings are sent to appropriate people.

Figure 7:
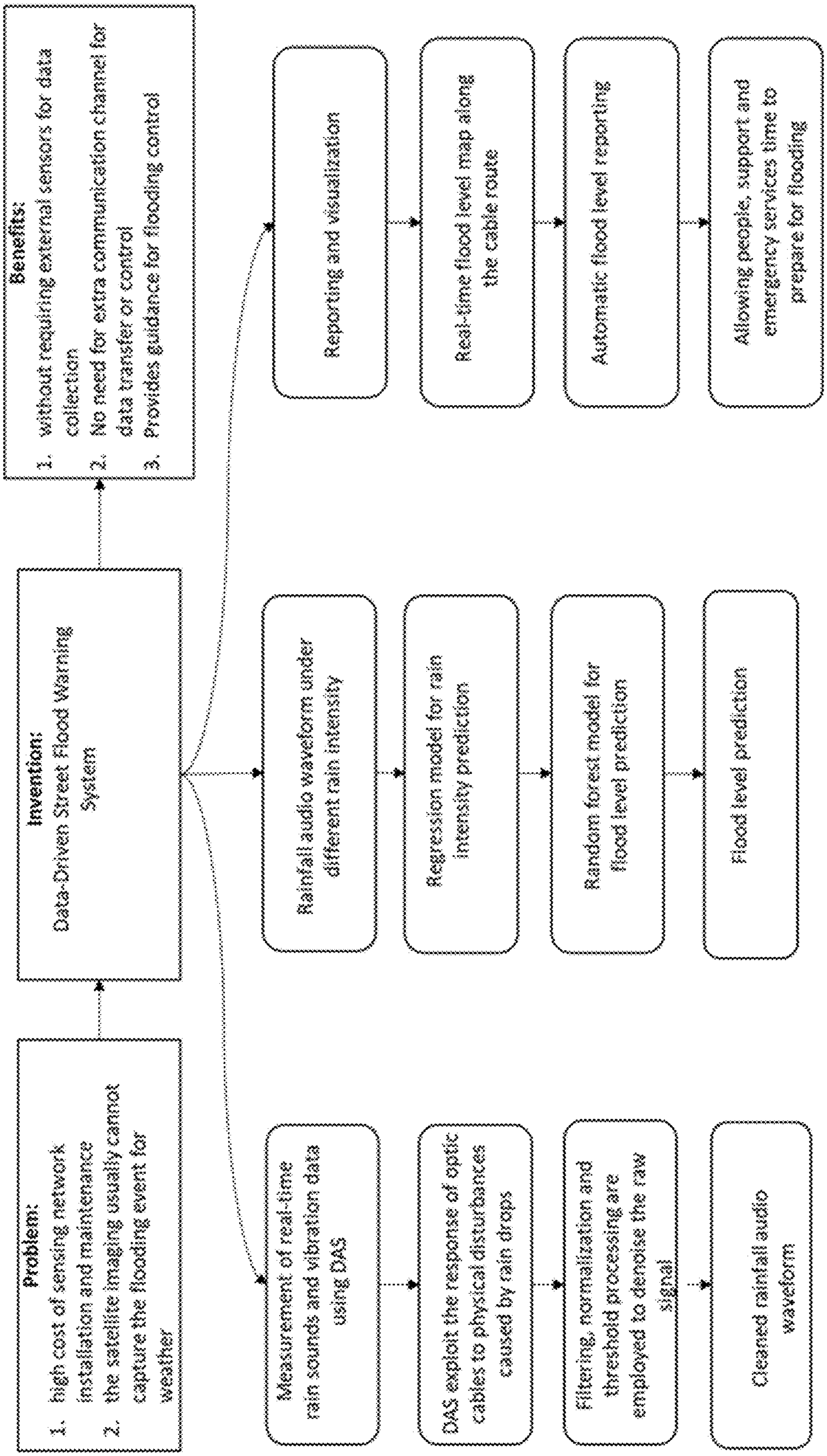
FIG. 7 is a schematic diagram showing illustrative operational features of rain intensity and flood monitoring using DFOS/DAS and ML according to aspects of the present disclosure.

FIG. 7 is a schematic diagram showing illustrative operational features of rain intensity and flood monitoring using DFOS/DAS and ML according to aspects of the present disclosure. As we have previously noted, our inventive systems and methods solve problems associated with predicting flooding events resulting from unpredictable weather-related events. Our data driven street flood warning systems and methods advantageously operate without requiring external sensors—other than deployed optical communications fiber cables—for data collection. Extra communications channel(s) for data collection/control/transfer are not required and flood control/warning is provided.

As we have described, our inventive systems and methods employ DFOS/DAS to detect/measure, in real-time, rain sounds and vibration data using DAS. Advantageously, DAS exploits the response of fiber optic cables to physical disturbances caused by falling rain drops. Filtering, normalization, and threshold processing are employed to denoise the raw signals and the resulting clean rainfall audio/vibrational waveforms are used for flood prediction.

Our audio waveforms are collected/recorded under different rain intensities. A regression model is subsequently used for rain intensity prediction. A random forest model is used for flood level prediction and results of the predictions are reported in real-time on a flood level map along the fiber optic cable route. Our systems and methods operate automatically, and advantageously allow people, support, and emergency services to prepare for predicted flooding.

At this point, while we have presented this disclosure using some specific examples, those skilled in the art will recognize that our teachings are not so limited. Accordingly, this disclosure should only be limited by the scope of the claims attached hereto.

The invention claimed is:

1. A street flood warning method comprising:

operating a distributed fiber optic sensing (DFOS) system connected to an aerial optical fiber to sense rainfall-related vibrations;

receiving data indicating the rainfall-related vibrations sensed by the DFOS system;

predicting, from the data, a rain intensity using a trained linear regression model;

determining a rain duration associated with the rain intensity;

predicting a flood level using a random forest model based on at least the rain intensity, the rain duration, and historical flood level data; and outputting an alert when the predicted flood level is above a threshold level.

2. The method of claim 1 further comprising training the linear regression model using training data of rain intensity and duration.

3. The method of claim 2 further comprising extracting features from the training data according to four classes including no rain, light rain, moderate rain, and heavy rain.

4. The method of claim 3 wherein the random forest model predicted flood levels include level 1, stand by; level 2, preparation; and level 3, evacuation levels.

5. The method of claim 4 further comprising splitting a dataset into dependent and independent variables in which the rain intensity, the rain duration, and the historical flood level are independent variables and the flood level is a dependent variable.

6. The method of claim 5 further comprising using dependent and independent variable datasets to train the random forest model.

7. The method of claim 6 further comprising outputting the alert using a real-time flood map along the target route.

8. The method of claim 1, further comprising: preprocessing the received data indicating the rainfall-related vibrations prior to predicting the rain intensity, wherein the preprocessing includes filtering, normalizing, and applying threshold processing to denoise a raw acoustic signal of the rainfall-related vibration.

9. The method of claim 1, further comprising: receiving ambient vibration data corresponding to a no-rain condition from the DFOS system; and utilizing the ambient vibration data as a baseline to isolate the rainfall-related vibrations from the received data.

10. A street flood warning system comprising:

a receiver configured to receive data indicating rainfall-related vibrations sensed by a distributed fiber optic sensing (DFOS) system;

a memory storing instructions; and a processor configured to execute the instructions to:

predict, from the data, a rain intensity using a trained linear regression model;

determine a rain duration associated with the rain intensity;

predict a flood level using a random forest model based on at least the rain intensity, the rain duration, and historical flood level data; and output an alert when the predicted flood level is above a threshold level.

11. The system of claim 10, wherein the DFOS system is connected to an optical fiber comprising an aerial optical fiber cable.

12. The system of claim 10, wherein the DFOS system further comprises an interrogator configured to transmit an optical interrogation signal into the aerial optical fiber cable and receive backscattered optical signals from the aerial optical fiber cable, wherein the data indicating the rainfall-related vibrations is generated based on disturbances in the backscattered optical signals caused by raindrops striking the aerial optical fiber cable.

13. A non-transitory computer-readable storage medium having instructions stored thereon that, when executed by a processor, cause the processor to perform operations comprising:

receiving data indicating rainfall-related vibrations sensed by a distributed fiber optic sensing (DFOS) system connected to an aerial optical fiber;

predicting, from the data, a rain intensity using a trained linear regression model;

determining a rain duration associated with the rain intensity;

predicting a flood level using a random forest model based on at least the rain intensity, the rain duration, and historical flood level data; and outputting an alert when the predicted flood level is above a threshold level.

* * * * *